United States Patent
Koeckritz et al.

(10) Patent No.: US 11,712,756 B2
(45) Date of Patent: Aug. 1, 2023

(54) PAPER MACHINE CLOTHING AND METHOD OF PRODUCING THE SAME

(71) Applicant: Voith Patent GmbH, Heidenheim (DE)

(72) Inventors: Uwe Koeckritz, Heidenheim (DE); Reinhard Holl, Lauingen (DE); Jens Kallenberg, Herbrechtingen (DE); Michael Straub, Soehnstetten (DE); Cedric Fitzer, Weissenhorn (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 17/684,591

(22) Filed: Mar. 2, 2022

(65) Prior Publication Data

US 2022/0305589 A1 Sep. 29, 2022

(30) Foreign Application Priority Data

Mar. 5, 2021 (EP) .................... 21160973

(51) Int. Cl.
*B23K 26/382* (2014.01)
*B23K 26/40* (2014.01)
*D21F 1/00* (2006.01)
*B23K 103/00* (2006.01)

(52) U.S. Cl.
CPC ............ *B23K 26/382* (2015.10); *B23K 26/40* (2013.01); *D21F 1/0063* (2013.01); *B23K 2103/38* (2018.08)

(58) Field of Classification Search
CPC .. B23K 26/382; B23K 26/40; B23K 2103/38; D21F 1/0063
See application file for complete search history.

(56) References Cited

U.S. PATENT DOCUMENTS

| 4,446,187 A | 5/1984 | Eklund |
| 4,541,895 A | 9/1985 | Albert |
| 5,837,102 A | 11/1998 | Graf |
| 8,815,057 B2 | 8/2014 | Eberhardt et al. |

(Continued)

FOREIGN PATENT DOCUMENTS

| DE | 102010040089 A1 | 3/2012 |
| EP | 3348708 A1 | 7/2018 |

(Continued)

*Primary Examiner* — Eric Hug
*Assistant Examiner* — Matthew M Eslami
(74) *Attorney, Agent, or Firm* — Laurence A. Greenberg; Werner H. Stemer; Ralph E. Locher (57) ABSTRACT

A paper machine clothing has a plurality of through-channels formed in a usable region. The through-channels extend through the substrate to connect the upper and lower sides. The through-channels are non-cylindrical with a cross-sectional area becoming smaller along a thickness direction of the substrate from the upper side to a middle region of the substrate. An upper rim of at least one of the plurality of through-channels directly contacts an upper rim of at least one other neighboring through-channel of the plurality of through-channels, wherein the upper rims of both neighboring through-channels have at least three common local maxima, including two outer common local maxima and one intermediate common local maximum that is located between the two outer common local maxima. There is also described a method of producing such a paper machine clothing.

20 Claims, 5 Drawing Sheets

(56) References Cited

U.S. PATENT DOCUMENTS

2010/0236740 A1* 9/2010 Mourad ................ D21F 1/0036
83/30
2021/0189651 A1* 6/2021 Koeckritz .............. D06C 29/00

FOREIGN PATENT DOCUMENTS

| EP | 3561176 A1 | 10/2019 |
| EP | 3839135 A1 | 6/2021 |
| WO | 9102642 A1 | 3/1991 |
| WO | 2010088283 A1 | 8/2010 |

* cited by examiner

PAPER MACHINE CLOTHING AND METHOD OF PRODUCING THE SAME

CROSS-REFERENCE TO RELATED APPLICATION

This application claims the priority, under 35 U.S.C. § 119, of European Patent Application EP 21160973.0, filed Mar. 5, 2021; the prior application is herewith incorporated by reference in its entirety.

FIELD AND BACKGROUND OF THE INVENTION

The present invention concerns a paper machine clothing comprising a substrate with an upper side, a lower side, two lateral edges and an usable region between the two lateral edges, wherein the usable region comprises a plurality of through-channels extending through the substrate and connecting the upper side with the lower side, wherein the through-channels are non-cylindrical with a cross-sectional area becoming smaller when going in a thickness direction of the substrate from the upper side to a middle region of the substrate between the upper side and the lower side and wherein an upper rim of at least one of the plurality of through-channels directly contacts an upper rim of at least one other neighboring through-channel of the plurality of through-channels. Another aspect of the present invention concerns a method of producing such a paper machine clothing.

In the sense of the present invention the term "paper machine clothing", abbreviated "PMC," refers to any kind of a rotating clothing used to transport a nascent or already formed fiber web in a machine that is designed to continuously produce and/or finish a fiber web, such as paper, tissue or board material. For historical reasons, PMC is sometimes also called wire, felt or fabric. In particular, PMC can be a forming wire or a dryer fabric or a press felt, depending upon its intended use in the corresponding machine. Furthermore, in the sense of the present invention the term PMC may also refer to any kind of clothing used in wet and/or dry production of fibrous nonwovens.

The term "substrate" in the sense of the present invention refers to some kind of foil material made of plastic. The substrate itself is usually impermeable to water, so that through-channels are needed to obtain a desired permeability, e.g., for dewatering the nascent fiber web or further drying the already formed fiber web. The substrate can be formed in a monolithic way or comprise several layers that might be co-extruded or produced separately and laminated together afterwards. After joining the longitudinal ends of the substrate to each other, e.g., by laser welding, to obtain some kind of an endless belt, the perforated substrate may already represent the final product, for example a forming wire. For other applications, further steps might be necessary to produce the final PMC, such as permanently attaching fibers thereto to form a press felt. Furthermore, the substrate may comprise a reinforcing structure, such as yarns, that may be imbedded therein. After joining the longitudinal ends of the substrate to each other, the "upper side" of the substrate shall be the radially outer side, sometimes also referred to as "paper side", whereas the "lower side" of the substrate shall be the radially inner side, sometimes also referred to as "machine side". Notably, instead of joining the longitudinal ends of the substrate to produce the PMC, a strip of the substrate having a width that is smaller than the width of the final PMC may be spirally wound e.g., about two cylinders spaced apart from each other, wherein the lateral edges of the strip are connected to each other or edge regions that overlap each other are connected to each other.

Figure 1:
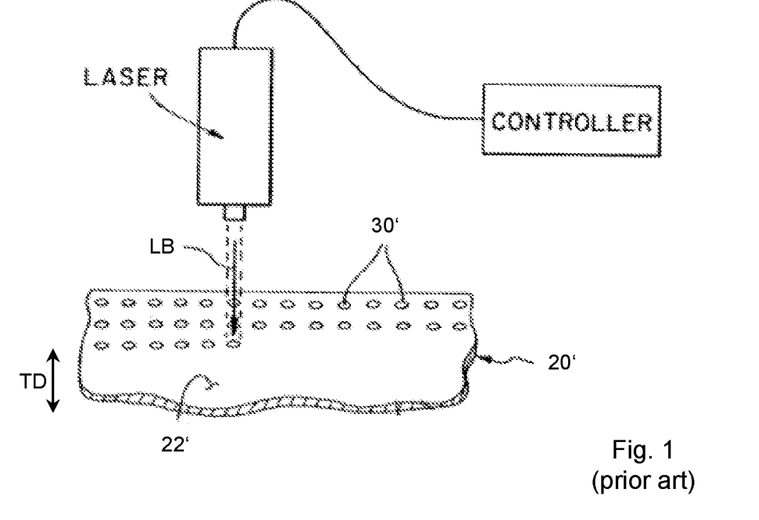
FIG. 1 is a schematic view of a prior art device for forming openings in a clothing.

The concept of producing a PMC from a substrate that is perforated, especially by using a laser, has already been known for quite a long time in the prior art and described e.g., in the 1980's and 1990's in the patent documents U.S. Pat. Nos. 4,541,895 and 5,837,102, respectively, the content of which is hereby incorporated by reference. FIG. 1 illustrates the processes of perforating a substrate via laser drilling according to the U.S. Pat. No. 5,837,102 reference. FIG. 1 only shows a portion of a substrate 20' used to produce a PMC forming fabric. The substrate 20' has a first surface 22' and an opposite second surface that is not shown in the figure. Even though the first surface 22' may be embossed it can be considered as being substantially plane and parallel to the second surface. The substrate 20' is perforated using a laser beam LB from a laser that is connected to a controller so as to drill a plurality of discrete through-channels 30' into the substrate 20'. The through-channels 30' connect the side of the first surface 22' with the side of the opposite second surface of the substrate 20'. The through-channels 30' extend in the thickness direction TD of the substrate 20', i.e., perpendicular to the first surface 22' and the second surface.

In the sense of the present invention the term "usable region" refers to a region of the PMC that is actually used for the production and/or the finishing of the fiber web. The usable region may span the complete width of the PMC, i.e., may reach from one lateral edge to the other lateral edge thereof. Alternatively, the usable region may refer only to a region that is located between the two lateral edges and is spaced apart from the two lateral edges. In the latter case, the PMC may have another configuration, such as permeability and thickness, outside the usable region compared to the usable region.

The term "cross-sectional area" of a through-channel in the sense of the present invention refers to an area of the through-channel that is obtained by cutting the through-channel with a plane that is perpendicular to the thickness direction of the substrate.

The term "non-cylindrical" in the sense of the present invention means that there are at least two different cross-sectional areas of a through-channel. For example, in the case of a non-cylindrical through channel that is substantially conical, a cross-sectional area taken at a first plane perpendicular to the thickness direction of the substrate may be substantially circular having a first radius, whereas another cross-sectional area taken at a second plane perpendicular to the thickness direction of the substrate may be also substantially circular but having a second radius that differs from the first radius.

Another paper machine clothing is known for example from the disclosure of the patent documents U.S. Pat. No. 4,446,187 A and DE 10 2010 040 089 A1, the content of which is hereby incorporated by reference. FIGS. 2, 3a, 3b and 3c are based on the disclosure of U.S. Pat. No. 4,446,187.

Figure 2:
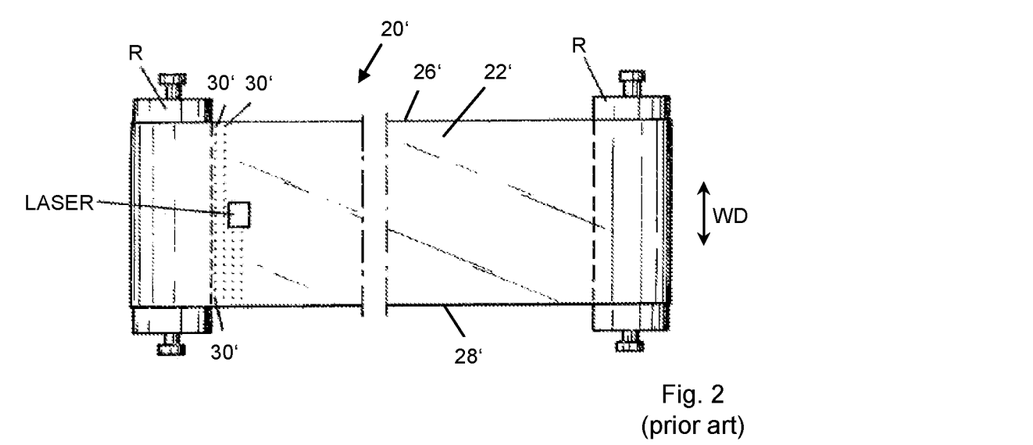
FIG. 2 is a plan view onto a substrate that is placed under tension between two rollers.
Figure 3A:
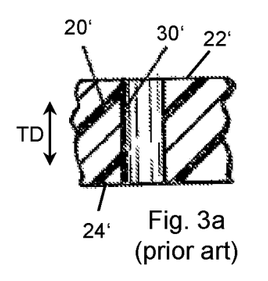
FIGS. 3a, 3b and 3c show different possible configurations of the through-channels according to the prior art.
Figure 3B:
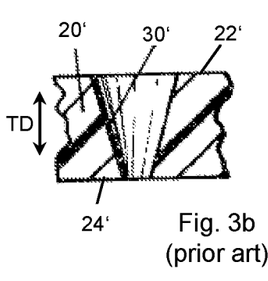
Figure 3C:
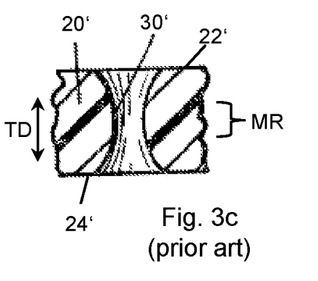

FIG. 2 shows a substrate 20' that is placed under tension between two rollers R. The substrate 20' has a radially outer, first surface 22' and an opposite, radially inner, second surface 24', as can be seen in FIGS. 3a, 3b and 3c. The first surface 22' and the second surface 24' are planar and parallel to each other. The thickness direction TD is oriented perpendicular to the first surface 22' and the second surface 24'. The substrate 20' further comprises a first lateral edge 26' and a second lateral edge 28'. In this example, the usable region of the substrate 20' extends in width direction WD of the substrate 20' the full way from the first lateral edge 26' to the second lateral edge 28'. In the usable region the substrate 20' is perforated by a laser that is drilling a plurality of discrete through-channels 30' into the substrate 20'. As indicated in FIG. 2 the laser first makes the through-channels 30' close to the first lateral edge 26' in a first row and continues moving across the substrate 20' to the through-channel 30' close to the second lateral edge 28' at the end of the same row. Thereafter, the laser is displaced by one row to make another through-channel 30' close to the first lateral edge 26' in a next row.

FIGS. 3a, 3b and 3c show different possible configurations of the through-channels 30'. In FIG. 3a the through-channel is cylindrical having the same cross-sectional area at any location along the thickness direction TD of the substrate 20'. In FIG. 3b the through-channel 30' is conical wherein the cross-sectional area of the through-channel 30' close to the first surface 22' is larger than the cross-sectional area of the through-channel 30' close to the second surface 24'. In FIG. 3c the through-channel 30' is neither cylindrical nor conical. Instead it resembles a hyperboloid having a cross-sectional area that is also always circular, like in the previous two examples, but the radius of this circle is first decreasing when going in thickness direction TD from the first surface 22' to a middle region MR of the substrate 20' situated in the thickness direction TD between the first surface 22' and the second surface 24', and is then increasing again when further going from the middle region MR of the substrate 20' to the second surface 24'.

Fiber retention, permeability and the degree of marking are characteristic parameters of a PMC that are important in view of the quality of the fiber web that is to be produced and/or finished on the PMC.

A basic paper machine clothing that is pertinent to the invention is known from the disclosure of applicants' earlier European published patent applications EP3348708 A1 and EP3561176 A1, the content of which is incorporated herein by reference. In these documents it is proposed to place neighboring through-channels so close to each other that their upper rims directly contact each other. The through-holes preferably "intersect" or "overlap" each other and, thus, make the topography of the upper surface of the substrate resemble the topography of an "egg box". With such a PMC a good permeability can be achieved with a high open area ratio on the paper side. This is especially important for good quality results of a nascent paper web when the PMC is used as a forming fabric.

However, the paper machine clothing disclosed in the published documents EP 3348708 A1 and EP 3561176 A1, while having a large open area on its paper side, it has only a limited number of contact points for the fibers of the nascent paper web. Thus, especially if the nascent fiber web comprises shorter fibers these fibers can be sucked into the tapering through-channel during the dewatering process resulting in clogging of the through-channels. Consequently, the dewatering capacity decreases where the through-channels are clogged, which then results in undesirable markings of the fiber web.

SUMMARY OF THE INVENTION

It is accordingly an object of the invention to provide a clothing which overcomes the above-mentioned disadvantages of the heretofore-known devices and methods of this general type and which provides for a paper machine clothing with improved characteristics compared to the known paper machine clothing, thereby allowing to produce a fiber web of very high quality.

With the above and other objects in view there is provided, in accordance with the invention, a paper machine clothing, comprising:

a substrate with an upper side, a lower side, two lateral edges and a usable region between said two lateral edges;

said usable region having a plurality of through-channels formed therein each extending along a central axis through said substrate and connecting said upper side with said lower side;

said through-channels being non-cylindrical with a cross-sectional area thereof becoming smaller along a thickness direction of the substrate from said upper side to a middle region of said substrate between said upper side and said lower side;

said through-channels having an upper rim and at least two of said through-channels being neighboring through-channels with upper rims directly contacting one another; and said upper rims of said neighboring through-channels having at least three common local maxima with two external common local maxima and one intermediate common local maximum located between said two external common local maxima.

In other words, the objects of the invention are achieved by a paper machine clothing wherein the upper rims of both neighboring through-channels have at least three, preferably exactly three, common local maxima comprising two external common local maxima and one intermediate common local maximum that is located between the two external common local maxima.

In the sense of the present invention the term "neighboring" could be replaced by the term "adjacent," meaning that there is no other through-channel placed between two neighboring or adjacent through-channels. Furthermore, in the sense of the present invention the term "upper rim" of a through-channel refers to the rim of the through-channel on the upper side of the substrate. The rim itself may be defined as a closed line where the sidewall of the through-channel ends. In view of the previously described examples of the prior art shown in FIGS. 1 to 3c, the upper rim can be easily identified, always being completely surrounded by the first surface 22'. To be more specific, in these examples, the upper rim is always a circular line lying within the plane of the first surface 22' of the substrate 20'. In contrast, according to embodiments disclosed in our earlier European applications EP3348708 A1 and EP3561176 A1, the upper rim of a through-channel does not lie within a plane. In some of these embodiments, the upper rim is partially surrounded or defined by portions of the still existing first surface of the substrate and partially by the sidewall of at least one neighboring through-channel. Especially the portions of the still existing first surface of the substrate can contribute to markings of the nascent paper web formed on the PMC when the PMC is used as forming fabric. The nascent paper web lies flat on these portions and dewatering there is consequently more difficult compared to other portions where the nascent paper web is "hanging" over the openings of the through-channels.

Furthermore, in these embodiments the upper rims of two neighboring through-channels have only two common local maxima serving as "support points" for the fibers of the nascent fiber web. Thus, the distance between these support points is quite long and if fibers of the nascent fiber web are too short, they cannot "hang" between these portions. They will rather be sucked into the through-channel which will become clogged then.

It is the merit of the inventors to have found out that this problem can be solved by providing some kind of "additional support point" formed by an intermediate common local maximum between the two external common local maxima which are known from the embodiments of the prior art. With the additional support point the fibers can be better prevented from entering the through-channel and the risk of clogging will be reduced. Thus, markings can also be avoided.

The term "common local maximum" preferably refers to a point of the topography of the upper side of the substrate that is like an apex or a mount peak and from which the surface of the upper side declines in all directions.

Preferably, the at least three common local maxima all lie within a first sectional plane that is parallel to the thickness direction of the substrate, wherein the first sectional plane can be equidistant from the central axes of the two neighboring through-channels.

Moreover, it is preferable for the intermediate local maximum to lie in a second sectional plane that comprises the central axes of the two neighboring through-channels. In other words, the intermediate common local maximum lies just in the middle between the two neighboring through-channels. It may also lie just in the middle between the two external common local maxima.

To avoid a reduction of the open area on the paper side of the paper machine clothing it is preferred that the height of the intermediate local maximum is lower than the height of any of the two external common local maxima.

In a preferred embodiment of the present invention a third sectional plane being parallel to the thickness direction of the substrate, comprising one of the two external common local maxima and comprising or intersecting the central axis of at least one of the two neighboring through-channels defines an intersecting line with a sidewall of the at least one of the two neighboring through-channels, wherein the intersecting line comprises a first portion that is convexly shaped, a second portion that is concavely shaped and a third portion that is again convexly shaped when going in the thickness direction of the substrate from the at least one common local maximum toward the middle region of the substrate.

It is the merit of the inventors to have found out that the problem of markings can be further reduced by providing some kind of "pin-like-structure" forming a common local maximum of the rims of neighboring through-channels and functioning as some kind of fiber-support-points for the nascent paper web. With this "pin-like-structure" there is only a very small contact area between the nascent paper web and the PMC allowing the nascent paper web to be substantially equally dewatered over its complete surface.

The three portions of the intersecting line, namely the first portion that is convexly shaped, the second portion that is concavely shaped and the third portion that is again convexly shaped when going in the thickness direction of the substrate from the at least one common local maximum toward the middle region of the substrate are preferably directly connected to each other. In other words, the first portion is preferably directly connected to the second portion at a first inflection point and the second portion is directly connected to the third portion at a second inflection point.

Preferably, the above description of the three portions of the intersecting line does not only apply to the intersection line that is defined by the third sectional plane, but applies to all intersection lines that are defined by any sectional plane that is parallel to the thickness direction of the substrate and that comprises one of the two external common local maxima, no matter if this sectional plane also comprises or intersects the central axis of at least one of the two neighboring through-channels. In other words, it is proposed that the intersecting line that is defined by intersecting the substrate with a sectional plane being parallel to the thickness direction of the substrate and comprising one of the two external common local maxima comprises a first portion that is convexly shaped, a second portion that is concavely shaped and a third portion that is again convexly shaped when going in the thickness direction of the substrate from the at least one common local maximum toward the middle region of the substrate.

Furthermore, it is proposed that a first inflection point that is located between the first portion and the second portion of the intersecting line, and preferably also a second inflection point that is located between the second portion and the third portion of the intersecting line, is/are located close to the at least one local maximum, i.e., in the upper fourth, preferably in the upper fifth, more preferably in the upper sixth, of the substrate. In other words, the dimension or height of the "pin-like-structure" is preferably rather small compared to the overall dimension or height of the substrate in its thickness direction. It is not the aim of the "pin-like-structure" e.g., to contribute to the tensile strength of the substrate, but to provide some kind of fiber support point for the nascent fiber web, so as to allow for a good dewatering of the PMC substantially over the complete surface of the nascent fiber web. Consequently, the "pin-like-structure" does not need to be or even should not have a large dimension or height.

In a preferred embodiment of the present invention at least 90%, preferably all, of the through-channels in the usable region of the substrate have an upper rim that directly contacts an upper rim of at least one other neighboring through-channel, preferably of all other neighboring through-channels, of the plurality of through-channels in the usable region of the substrate, wherein the upper rims of at least 12% of these directly neighboring through channels have at least three, preferably exactly three, common local maxima, comprising two external common local maxima and one intermediate common local maximum that is located between the two external common local maxima.

Furthermore, it is advantageous if less than 5%, preferably 0%, of a surface on the upper side of the substrate in its usable region is flat and substantially orthogonal to the thickness direction of the substrate. In other words, it is preferred if hardly any portion of the original first surface of the substrate, that was existing before the perforation process, is left after the perforation process. This may not apply to the edge region outside the usable region, which edge region could be unperforated or may have a lower density of perforations.

In contrast with the first surface, with respect to the second surface of the substrate, it is advantageous, if between 70% and 90%, preferably between 75% and 85%, and more preferably about 80%, of a surface on the lower side of the substrate is flat and substantially orthogonal to the thickness direction of the substrate. Such a result can be achieved if the cross-sectional area of the through-channels is smaller on the lower side of the substrate compared to the upper side of the substrate. For example, the through-channels may be substantially funnel-shaped tapering to the lower side of the substrate.

According to one embodiment of the present invention, the cross-sectional area of at least one through-channel, preferably of all through-channels, of the plurality of through-channels in the usable region of the substrate may continuously decrease when going in the thickness direction of the substrate from the upper side to the lower side of the substrate.

According to an alternative embodiment of the present invention, the cross-sectional area of at least one through-channel, preferably of all through-channels, of the plurality of through-channels in the usable region of the substrate continuously increases again when going in the thickness direction of the substrate from the middle region of the substrate between the upper side and the lower side to the lower side of the substrate. With such a configuration, the respective through-channel resembles the through-channel shown in FIG. 3c and the dewatering capability of the PMC may be enhanced by using the effect of a nozzle.

It is also possible to have in the same substrate a mixture of through-channels according to the two previously described embodiments.

Another advantageous feature of the present invention concerns the aspect that a shape of the cross-sectional area of at least one through-channel, preferably of all through-channels, of the plurality of through-channels can change when going in the thickness direction of the substrate from the upper side to the lower side.

Advantageously, the shape of the cross-sectional area is substantially more elliptical in an upper region of the through-channel than in a lower region of the through-channel. In mathematics, an ellipse is a curve in a plane surrounding two focal points such that the sum of the distances to the two focal points is constant for every point on the curve. As such, it is a generalization of a circle, which is a special type of an ellipse having both focal points at the same location. The shape of an ellipse (how "elongated" it is) is represented by its eccentricity, which for an ellipse can be any number from 0 (the limiting case of a circle) to arbitrarily close to but less than 1. Consequently, "the cross-sectional area being substantially more elliptical in an upper region of the through-channel than in a lower region of the through-channel" means that the shape of the cross-sectional area changes as the eccentricity of the substantially elliptically shaped cross-sectional area in the upper region of the through-channel is larger than the eccentricity of the substantially elliptically shaped cross-sectional area in the lower region of the through-channel, wherein the latter one might be even 0 (corresponding to a circle). Thereby, the value of the eccentricity may diminish continuously in thickness direction.

It will be appreciated that the terms "elliptical" and "circular" when used in the context of the cross-sectional areas of the through-channels must not be understood in a strictly mathematical sense. Some deviations, e.g., due to manufacturing tolerances, are allowed. Therefore, the term "elliptical" may be rather understood as "oval" as also described in the prior art international publications WO 91/02642 A1 and WO 2010/088283 A1.

In view of the through-channels 30' described with respect to FIGS. 3a, 3b and 3c, the basic shape of the cross-sectional area of the through-channels 30' is always the same, i.e., circular. However, it turned out to be advantageous—for reasons explained in more detail below—if the cross-sectional area of the through-channels 30' changes along the thickness direction of the substrate, in particular if the cross-sectional area is more elliptical close to the upper side of the substrate than in the lower side of the substrate. If the through-channels are drilled by a laser, such a form of the through-channels can be achieved for example by not shutting off of the laser or by at least not shutting off completely the laser when advancing with the laser from one through-channel to the next neighboring through-channel in a row. For example, a pulsed $CO_2$-laser can be in some kind of simmer operation mode between to pulses. By adjusting the simmer mode intensity, the shape of the through-channels can be controlled. Applying this method can result in that the upper rim of a through-channel is deeper below the original first surface of the substrate at a first point between two neighboring through-channels in the direction of advancement of the laser compared to a second point between two neighboring through-channels in a direction perpendicular thereto. The intermediate common local maximum of the present invention is preferably located at the second point and not at the first point.

With the above-described aspect of the present invention it is possible to impart anisotropic properties to the substrate in a beneficial way. For example, it is proposed that the shape of the cross-sectional area in the upper region of the through-channel has a first dimension extending in cross-machine direction and a second dimension extending in machine direction, wherein the first dimension is smaller than the second dimension. With such a configuration of the through-channels the substrate, and thus the final paper machine clothing, can stand higher stress in the machine direction compared to the cross-machine direction, wherein stresses that act on the paper machine clothing are usually in fact much higher in the machine direction than in the cross machine direction. As it is clear to those skilled in the art, the term "machine direction" refers to the longitudinal direction of the PMC, i.e., the direction of transportation of the fiber web or the fibrous nonwoven when the PMC is installed in a corresponding machine, whereas the term "cross machine direction" refers to a direction within the plane of the PMC that is perpendicular to the machine direction.

In an alternative embodiment it is proposed that the shape of the cross-sectional area in the upper region of the through-channel has a first dimension extending in cross-machine direction and a second dimension extending in machine direction, wherein the first dimension is larger than the second dimension. Such a form of the through-channels is particularly beneficial if the fiber retention on the paper machine clothing, in particular a forming fabric, shall be enhanced.

The first dimension and the second dimension preferably differ from each other by at least 5%, more preferably by at least 10%, and even more preferably by at least 15% of the respective smaller dimension.

Preferably, on the lower side of the substrate the shape of the cross-sectional area is substantially circular.

In order to increase the density of through-channels in the usable region of the substrate, and thus, to enhance the dewatering capability of the paper machine clothing, it is suggested that at least 90% of all through-channels in the usable region of the substrate are arranged in a non-checkered pattern. Arranging the through-channels in a checkered pattern would mean that the through-channels are evenly distributed in the usable region of the PMC like the fields of a classic chessboard. In contrast to this, arranging the through-channels in a non-checkered pattern means that the through-channels are distributed differently.

With the above and other objects in view there is also provided, in accordance with the invention, a method of producing a paper machine clothing as described in the foregoing. The method comprises the following steps:

providing a substrate having a first surface and a second surface, wherein the first surface and the second surface are substantially planar and parallel to each other; and forming a plurality of non-cylindrical through holes into a usable region of the substrate by using a laser;

forming at least some, or all, of the plurality of through holes that neighbor each other at such a close distance that the neighboring through holes partially overlap each other;

while forming the plurality of non-cylindrical through holes controlling the laser to form upper rims of mutually overlapping through holes with at least three common local maxima, including two external common local maxima and one intermediate common local maximum located between the two external common local maxima.

In other words, the present invention also pertains to a method for producing the paper machine clothing as previously described with the following steps: providing a substrate having a first surface and a second surface, wherein the first surface and the second surface are preferably planar and parallel to each other; and forming a plurality of non-cylindrical through holes into a usable region of the substrate by using a laser, wherein at least some, preferably all, of the plurality of through holes that are neighboring each other are formed at such a close distance that they partially overlap each other, wherein during the formation of the plurality of non-cylindrical through holes the laser is controlled in such a way that the upper rims of the overlapping through-holes have at least three, preferably exactly three, common local maxima, comprising two external common local maxima and one intermediate common local maximum that is located between the two external common local maxima.

The inventors have found that the "additional support point" can be created relatively easily during the perforation of the substrate via a laser, by correspondingly adjusting the power of the laser, the pulse length and the location of the focus of the laser. Thus, it is possible to make part of the material that is evaporated by the laser to condense again, thereby forming an additional support point, i.e., the intermediate common local maximum, and preferably also the "pin-like-structure" for the two external common local maxima.

The term "through hole" in the sense of the present invention refers to the form of a hole that is formed in the substrate neglecting the neighboring through holes that may partially overlap. In contrast, the term "through-channel" refers to the geometric form of the channels in the finally drilled substrate. Due to the fact that neighboring through holes may overlap each other according to the present invention, its form, especially in view of its upper rim, can differ from the form of the through-channels.

According to one embodiment of the present invention it is proposed that, when all the through holes have been formed into the usable region of the substrate, at least one of the first surface and the second surface in the usable region has disappeared by at least 80%, preferably by 100%. As result the finally drilled substrate has none or hardly any opposite surface portions that are planar and parallel to each other.

Preferably cold air is blown onto the substrate during the step of forming the through holes into the substrate. The cold air inhibits overheating and damaging of the substrate material, which is particularly important for the material region between two neighboring through holes when the laser is advancing from the first of the two through holes to the second one. Instead of cold air a $CO_2$ cooling foam may be applied.

Other features which are considered as characteristic for the invention are set forth in the appended claims.

Although the invention is illustrated and described herein as embodied in a paper machine clothing and a method of producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 4:
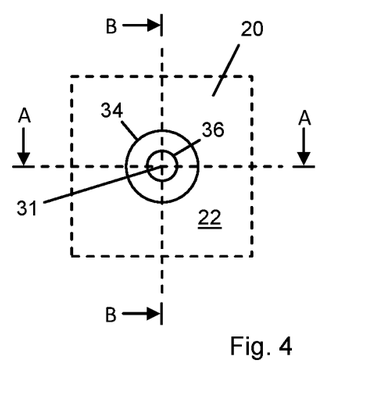
FIG. 4 shows a section of a substrate comprising a single through hole of a first type.

Referring now once more to the figures of the drawing in detail, FIG. 4 shows a section of a substrate 20 which section is indicated by a dashed square. The substrate 20 comprises a first surface 22 and an opposite second surface 24 (see FIG. 6), wherein the first surface 22 and the second surface 24 are substantially planar and parallel to each other.

Figure 6:
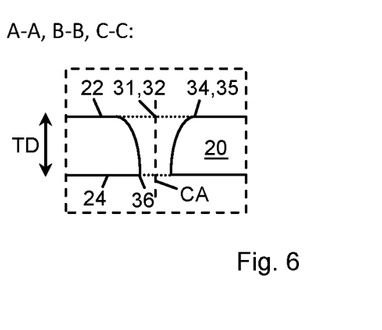
FIG. 6 shows a sectional view along lines A-A and B-B in FIG. 4 and along line C-C in FIG. 5.

A single through hole 31 of a first type is provided in the center of the section of the substrate 20. FIG. 6 shows a cross-sectional view which is taken through the through hole 31 along line A-A or line B-B of FIG. 4. As can be seen from FIGS. 4 and 6, the through hole 31 extends through the substrate 20 in its thickness direction TD along a central axis CA of the through hole 31, the central axis CA being indicated by a dashed line in FIG. 6. Thus, the through hole 31 connects the first surface 22 with the second surface 24 of the substrate 20. The through hole 31 is substantially funnel shaped with a cross-sectional area becoming continuously smaller when going in the thickness direction TD from the first surface 22 to the second surface 24. The cross-sectional area of a through hole 31 is obtained by cutting the through hole 31 with a plane that is oriented perpendicular to the thickness direction TD of the substrate 20. In this embodiment the shape of the cross-sectional area of the through hole 31 is always circular, no matter at which height level of the substrate the cross-sectional area is taken.

Figure 4A:
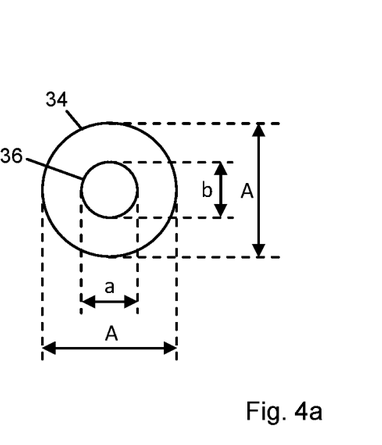
FIG. 4a shows an enlarged view of the through hole in FIG. 4.

The through hole 31 has a circular upper rim 34 where a sidewall of the through hole 31 ends and the flat first surface 22 begins. The circular upper rim 34 has a diameter A, as shown in FIG. 4a. Furthermore, the through hole 31 has a circular lower rim 36 where the sidewall of the through hole 31 ends and the flat second surface 24 begins. The circular lower rim 36 has a diameter a, as also shown in FIG. 4a. Diameter A of the upper rim is larger than diameter a of the lower rim.

Figure 5:
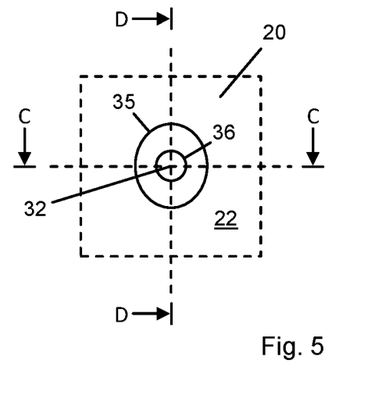
FIG. 5 shows a section of a substrate comprising a single through hole of a second type.

FIG. 5 shows another section of a substrate 20 which section is also indicated by a dashed square. The substrate 20 comprises a first surface 22 and a second surface 24 (see FIG. 7), wherein the first surface 22 and the second surface 24 are substantially planar and parallel to each other.

Figure 7:
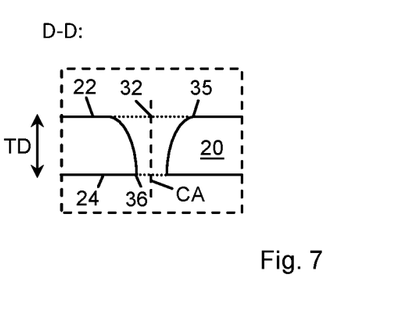
FIG. 7 shows a sectional view along line D-D in FIG. 5.

A single through hole 32 of a second type is provided in the center of the section of the substrate 20. FIG. 6 shows a cross-sectional view which is taken through the through hole 32 along line C-C of FIG. 5 and FIG. 7 shows a cross-sectional view which is taken through the through hole 32 along line D-D of FIG. 5. As can be seen from FIGS. 5, 6 and 7, the through hole 32 extends through the substrate 20 in its thickness direction TD along a central axis CA of the through hole 32, the central axis CA being indicated by a dashed line in FIGS. 6 and 7. Thus, the through hole 32 connects the first surface 22 with the second surface 24 of the substrate 20. The through hole 32 is substantially funnel shaped with a cross-sectional area becoming continuously smaller when going in a thickness direction TD from the first surface 22 to the second surface 24. The cross-sectional area of the through hole 32 is obtained by cutting the through hole 32 with a plane that is oriented perpendicular to the thickness direction TD of the substrate 20. In this embodiment the shape of the cross-sectional area of the through hole 32 is not constant but changes when going along the thickness direction TD of the through hole 32. In an upper region of the substrate 20, i.e., in a region close to the first surface 22, the through hole 32 is more oval or elliptical, whereas in a lower region of the substrate 20, i.e., in a region close to the second surface 24, the through hole 32 is more or completely circular. The shape of the cross-sectional area of the through hole 32 preferably changes continuously along the thickness direction TD of the substrate 20.

Figure 5A:
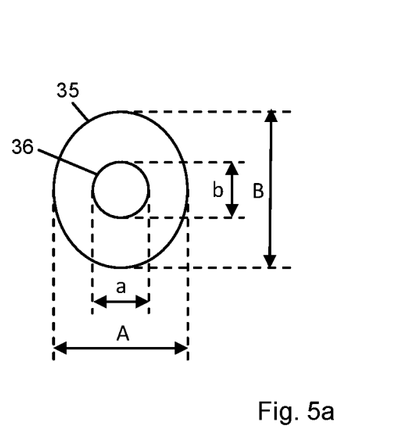
FIG. 5a shows an enlarged view of the through hole in FIG. 5.

Thus, the through hole 32 has an elliptical upper rim 35 where a sidewall of the through hole 32 ends and the flat first surface 22 begins. The elliptical upper rim 35 has a first diameter A and a second diameter B measured orthogonally thereto, as indicated in FIG. 5a. Furthermore, the through hole 32 has a circular lower rim 36 where the sidewall of the through hole 32 ends and the flat second surface 24 begins. The circular lower rim 36 has a diameter a, as also shown in FIG. 5a. The second diameter B of the upper rim 35 is larger than the first diameter A of the upper rim 35. The first diameter A of the upper rim 35 is larger than the diameter a of the lower rim 36. Preferably, the second diameter B of the upper rim 35 is at least 5%, more preferably at least 10%, even more preferably at least 15% larger than the first diameter A of the upper rim 35.

Figure 8:
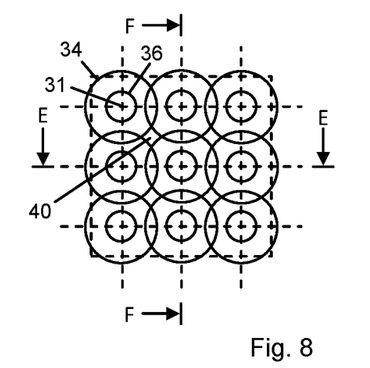
FIG. 8 shows a section of a substrate comprising a plurality of through holes of the first type.
Figure 9:
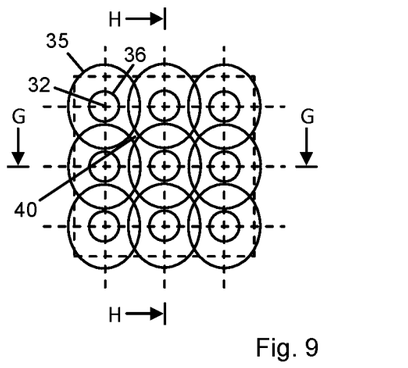
FIG. 9 shows a section of a substrate comprising a plurality through holes of the second type.

Several of such non-cylindrical through holes are arranged in such a close relationship that they partially overlap each other in the substrate. Examples of such arrangements for the through holes 31 of the first type and the through holes 32 of the second type are shown in FIGS. 8 and 9, respectively. To be more precise, nine corresponding through holes 31, 32 arranged in a checkered pattern are shown in these figures. The through holes 31, 32 each have a respective lower rim 36. Furthermore, for the sake of clarity, also the corresponding upper rims 34, 35 of the through holes 31, 32 are shown, even though these upper rims 34, 35 do not exist anymore as such in the final product. Instead, in the final product, i.e., in the finally perforated substrate 20, through-channels 30 are formed having a respective upper rim 38 that is at least partially delimited by the upper rim 38 of a neighboring through-channel 30. As shown in FIGS. 8 and 9, the originally existing flat or planar first surface 22 of the substrate 20 has completely disappeared after the perforation of the substrate 20 in the usable region UR thereof. The reason for the complete disappearance of the originally flat first surface 22 of the substrate 20 is that the through holes 31, 32 have been laser-drilled and that the material of the substrate 20 that has been evaporated by the energy of the laser at least partially condenses again on the first surface 22, thus forming a "pin-like-structure" 40 that will be explained in more detail below. As a consequence, the upper rim 38 of a corresponding through-channel 30 does not extend within a plane but is rather a closed line that extends three-dimensionally. It should be noted that the upper rim 38 of the through-channel 30 may extend partially below the originally flat first surface 22 of the substrate 20 and/or extend partially above the originally flat first surface 22 of the substrate 20.

Figure 10:
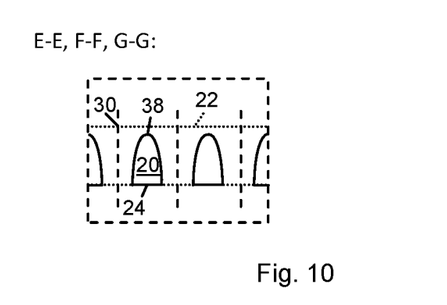
FIG. 10 shows a sectional view along lines E-E and F-F in FIG. 8 and along line G-G in FIG. 9.
Figure 11:
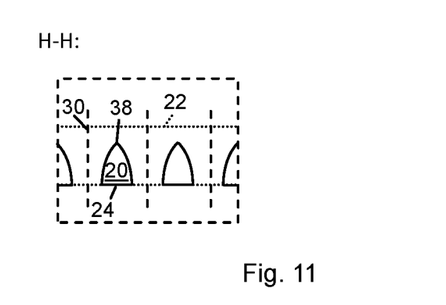
FIG. 11 shows a sectional view along line H-H in FIG. 9.

FIGS. 10 and 11 represent views similar to the ones shown in FIGS. 6 and 7, respectively, but now with several neighboring through holes 31, 32 that form the through-channels 30 in the substrate 20 of the final product. In FIG. 10 a location (see reference sign 38) of the upper rim 38 of the through-channel 30 of FIG. 8 is shown that represents an absolute minimum of the upper rim 38. In other words, the upper rim 38 has the largest distance to the originally flat first surface 22 of the substrate 20 which surface 22 is indicated by a dotted line in FIG. 10. The surface of the substrate 20 has a saddle point at this location of the upper rim 38.

In FIG. 11 a location (see reference sign 38) of the upper rim 38 of the through-channel 30 of FIG. 9 is shown (according to the section along line H-H of FIG. 9) that represents an absolute minimum of the upper rim 38 of this through-channel 30. In other words, the upper rim 38 has the largest distance to the originally flat first surface 22 of the substrate 20 which surface 22 is also indicated by a dotted line in FIG. 11. The surface of the substrate 20 has a saddle point at this location of the upper rim 38. A section along line G-G of FIG. 9 is represented by the drawing of FIG. 10. At the location of the upper rim 38 shown in this figure, the upper rim only has a local minimum. Thus, the ridges that separate two neighboring through-channels 30 from each other are higher when following the line G-G compared to the ridges when following the line H-H of FIG. 9. Consequently, the substrate has anisotropic properties.

These anisotropic properties can be used in a beneficial way. For example, the substrate that is perforated in a way as shown in FIGS. 9, 10 and 11 is more stress resistant in the direction parallel to line H-H compared to the direction parallel to line G-G. If line H-H substantially represents the machine direction of the final paper machine clothing the relatively high forces in the machine direction can be absorbed by the substrate 20 while at the same time the substrate 20 provides a relatively large open area on its upper side. Alternatively, if line H-H substantially represents the cross-machine direction of the final paper machine clothing the nascent paper web in a forming section can adhere better to the substrate 20 since ridges formed in the substrate 20 between neighboring rows of through channels 30 that extend in cross machine direction are higher than those extending in the machine direction. Consequently, the properties of the substrate 20 can be adjusted to the intended use or the requirements of the paper machine clothing.

Figure 12:
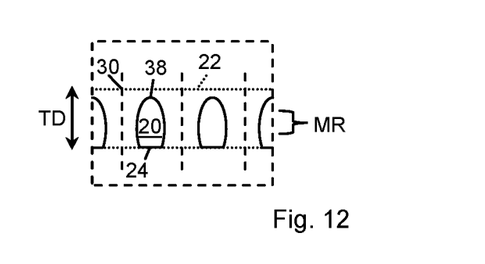
FIG. 12 shows a sectional view similar to the sectional view of FIG. 10, but with a third type of through holes.

FIG. 12 shows a sectional view similar to the cross-sectional view of FIG. 10, but of a third type of through holes. This third type of through holes differs from the first and second type of through holes 31, 32 in that the cross-sectional area of the through hole of the third type and, thus, the cross-sectional area of the corresponding through-channel 30 that is created thereof, continuously increase again when going in the thickness direction TD of the substrate 20 from the middle region MR of the substrate 20 between the upper side and the lower side to the lower side of the substrate 20. In an extreme case, neighboring through holes may not only partially overlap each other on the first side 22 of the substrate 20 but also on the second side 24 thereof.

Figure 13:
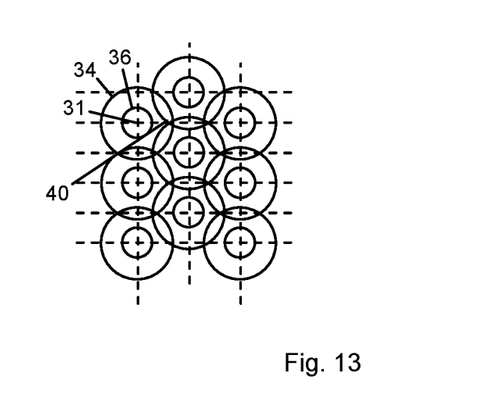
FIG. 13 shows a section of a substrate similar to the one shown in FIG. 8, but with the through holes are arranged in a non-checkered pattern.
Figure 14:
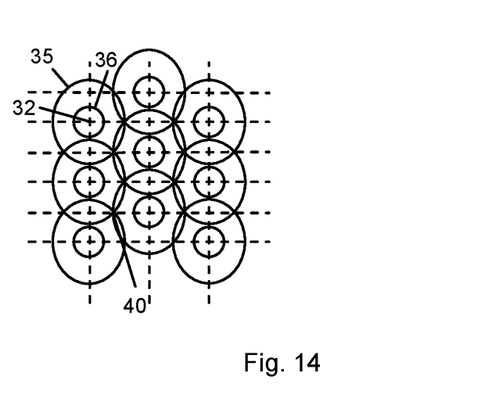
FIG. 14 shows a section of a substrate similar to the one shown in FIG. 9, but with the through holes are arranged in a non-checkered pattern.

FIGS. 13 and 14 show a section of a substrate 20 similar to the one shown in FIGS. 8 and 9, respectively, with the difference that the through holes 31, 32 are arranged in a non-checkered pattern. In FIGS. 8 and 9 each through hole 31, 32 has eight neighboring, other through holes 31, 32 wherein the distance to four of these eight neighboring through holes 31, 32 is larger than the distance to the remaining four neighboring through holes 31, 32.

In contrast, in the examples shown in FIGS. 13 and 14, each through hole 31, 32 has six neighboring, other through holes 31, 32 wherein the distance to all these neighboring through holes 31, 32 is substantially the same (for example corresponding to the smaller distance of the embodiments shown in FIGS. 8 and 9). These six neighboring through holes 31, 32 are arranged in a honeycomb pattern around a corresponding through hole 31, 32 in the middle thereof. With such an arrangement, the density of through-channels 31 in the final substrate 20 can be increased, as well as the open area on the upper side of the substrate 20.

Figure 15:
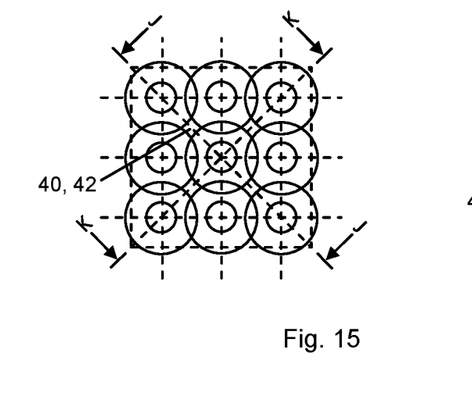
FIG. 15 shows a section of a substrate comprising a plurality of through holes of a forth type.
Figure 16:
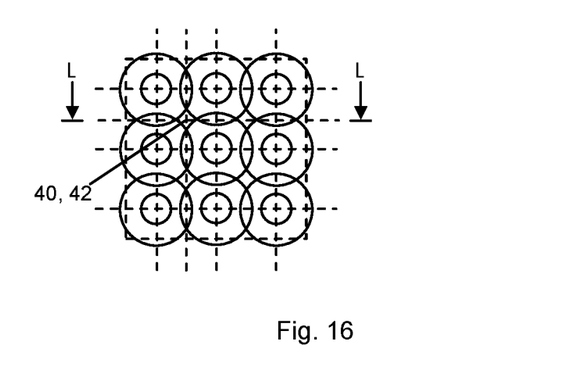
FIG. 16 also shows a section of a substrate comprising a plurality of through holes of the forth type.
Figure 17:
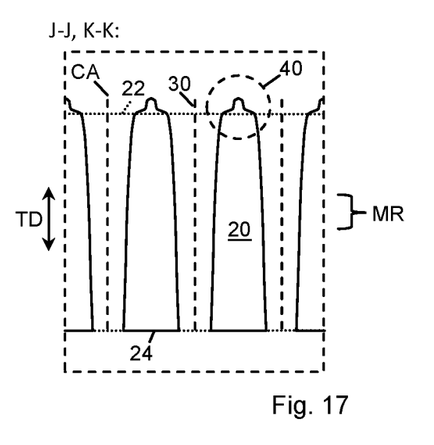
FIG. 17 shows a sectional view along lines J-J and K-K in FIG. 15.

FIGS. 15 and 16 each show a section of a substrate comprising a plurality of through holes of a forth type. FIGS. 15 and 16 are substantially identical to FIG. 8 which shows a section of a substrate comprising a plurality of through holes of a first type. However, the holes of the forth type are longer (or the substrate has a larger thickness) compared to the holes of the first type as can be seen by comparing FIGS. 17 and 18 with FIG. 10. It should be noted that this difference is not decisive for the effect of the present invention, especially when taking into account that the figures only represent only schematic drawings anyway. Therefore, the following description of FIGS. 16-18a may equally refer to the embodiment shown in FIG. 8. FIG. 17 represents a sectional view along lines J-J and K-K of FIG. 15 and FIG. 18 represents a sectional view along line L-L of FIG. 16. In FIGS. 17 and 18 a detail referring to the "pin-like-structure" 40 is emphasized with a dashed circle and this detail is shown in enlarged views in FIGS. 17a and 18a, respectively.

Lines J-J and K-K in FIG. 15 each describes a sectional plane, also referred to as third sectional plane, that is parallel to the thickness direction TD of the substrate 20 and that comprises the central axis CA of at least one of two neighboring through-channels 30 the upper rims of which have at least one local maximum 42 in common, and which sectional plane further comprises the at least one local maximum 42. This external common local maximum 42 is illustrated in detail in FIGS. 17a and 18a and might be compared to an apex or a mount peak from which the surface of the upper side of the substrate 20 declines in all directions.

Figure 17A:
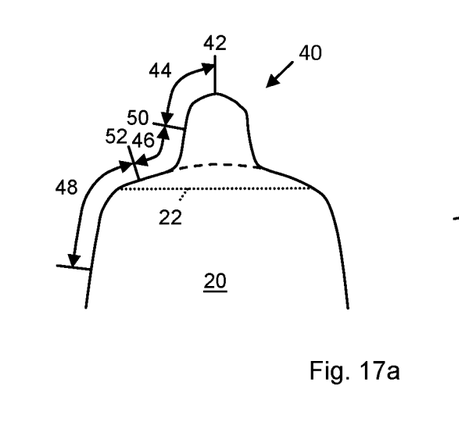
FIG. 17a shows an enlarged view of a "pin-like-structure" in FIG. 17.
Figure 18:
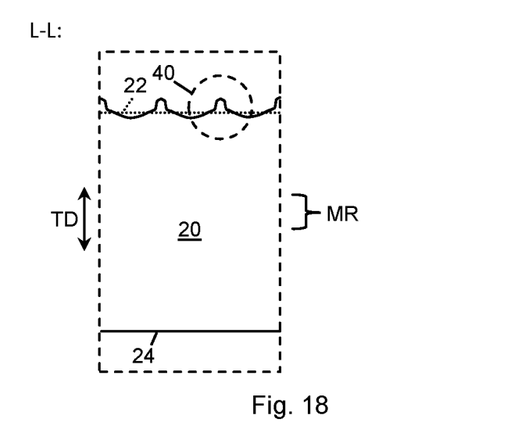
FIG. 18 shows a sectional view along line L-L in FIG. 16.

The outline of the substrate 20 in the sectional view of FIGS. 17 and 17a comprises a first portion 44 that is convexly shaped, a second portion 46 that is concavely shaped and a third portion 48 that is again convexly shaped when going in the thickness direction TD of the substrate 20 from the external common local maximum 42 toward the middle region MR of the substrate 20. In this exemplary embodiment, the first portion 44 is directly connected to the second portion 46 at a first inflection point 50 and the second portion 46 is directly connected to the third portion 48 at a second inflection point 52. In the sectional view of FIGS. 17 and 17a the "pin-like-structure" 40 has a substantially symmetrical outline. Therefore, the outline does not only comprise a first, second and third portion 44, 46, 48 as described above on the left-hand side in FIG. 17a but also on the right-hand side in this figure. It should be noted, however, that the outline of the "pin-like-structure" 40 as shown in FIGS. 17 and 17a does not have to be symmetrical. For example, it is possible that the outline is somehow deformed to one side.

Figure 18A:
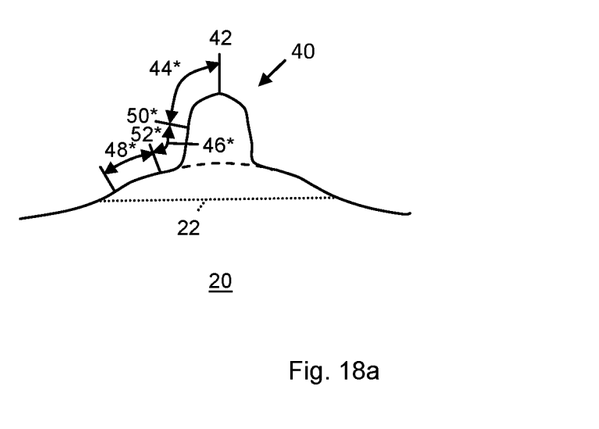
FIG. 18a shows an enlarged view of a "pin-like-structure" in FIG. 18.

Line L-L in FIG. 16 describes a sectional plane that is parallel to the thickness direction TD of the substrate 20, and that comprises the external common local maximum 42. However, this sectional plane—in contrast to the one shown in FIGS. 17 and 17a—does neither comprise nor intersect the central axis CA of any of the shown through-channels 30. As shown in FIGS. 18 and 18a also the outline of the substrate 20 in this sectional plane comprises a first portion 44* that is convexly shaped, a second portion 46* that is concavely shaped and a third portion 48* that is again convexly shaped when going in the thickness direction TD of the substrate 20 from the at least one common local maximum 42 toward the middle region MR of the substrate 20. In this exemplary embodiment, the first portion 44* is directly connected to the second portion 46* at a first inflection point 50* and the second portion 46* is directly connected to the third portion 48* at a second inflection point 52*. In in the sectional view of FIGS. 18 and 18a the "pin-like-structure" 40 has also a substantially symmetrical outline. Therefore, the outline does not only comprise a first, second and third portion 44*, 46*, 48* as described above on the left-hand side in FIG. 18a but also on the right-hand side in this figure. It should be noted, however, that the outline of the "pin-like-structure" 40 as shown in FIGS. 18 and 18a does not have to be symmetrical. For example, it is possible that the outline is somehow deformed to one side. Preferably, any outline of the substrate in the region of the "pin-like-structure" 40 comprises a first portion that is convexly shaped, a second portion that is concavely shaped and a third portion that is again convexly shaped when going in the thickness direction TD of the substrate 20 from the at least one common local maximum toward the middle region MR of the substrate 20, no matter what sectional plane has been chosen to define the outline, as long as the sectional plane is parallel to the thickness direction TD of the substrate 20 and comprises the local maximum 42.

In FIGS. 17, 17a, 18 and 18a, a dotted line indicates the original first surface 22 of the substrate 20. Preferably, the material that is located above this dotted line in the final product is at least partly material that has first been evaporated during the formation of the through-channels 30 by laser-drilling and has then been condensed again. A part of this material is material that has been molten and gets on the top of the substrate during the eruptive laser process. The inventors have found out that by correspondingly adjusting parameters, such as the power of the laser, the pulse length and the location of the focus of the laser, it is possible to create the "pin-like-structure" 40 relatively easily during the perforation of the substrate.

In laser drilled substrates known from the prior art, there is either no material above the dotted line that represents the original first surface 22 of the substrate 20, or there is material above this line, but only in the form of a smooth hill or ridge as indicated by a dashed line in FIGS. 17a and 18a. However, the formation of the "pin-like-structure" 40 is not know from the prior art.

The "pin-like-structure" 40 is advantageous because— especially when the laser drilled substrate is used as a forming fabric—it supports the fiber web punctually, thus providing a very good and equal dewatering for the fiber web substantially over its complete surface, thus, avoiding markings. Furthermore, the sheet release from the PMC may be enhanced by the "pin-like structure" 40.

Figure 19:
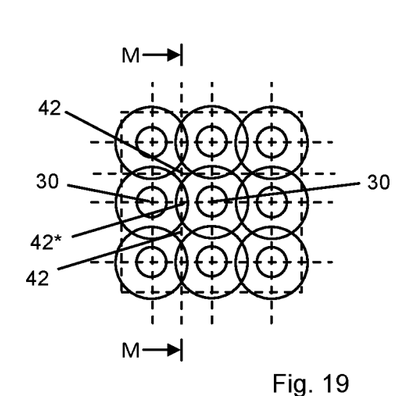
FIG. 19 shows substantially the same as FIG. 16.
Figure 20:
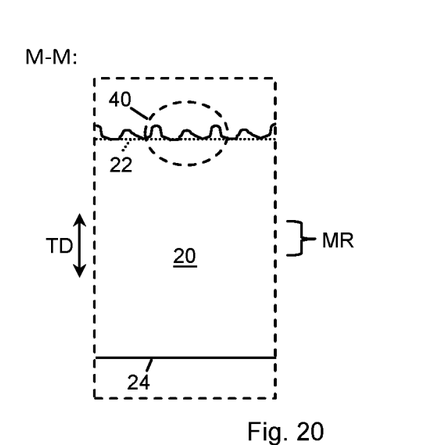
FIG. 20 shows a sectional view along line M-M in FIG. 19.

FIG. 19 substantially corresponds to FIG. 16. A first sectional plane that is parallel to the thickness direction TD of the substrate 20 is indicated by M-M in FIG. 19. The first sectional plane M-M is equidistant from the central axes CA of two neighboring through-channels 30. FIG. 20 shows the first sectional plane M-M and FIG. 20a shows an enlarged view of a portion of this plane M-M as indicated by reference sign 40 in FIG. 20.

Comparing the first sectional plane M-M shown in FIG. 20 with the sectional plane L-L shown in FIG. 18 which is perpendicular to first sectional plane M-M it can be seen that the first sectional plane M-M comprises more maxima 42, 42* than the sectional plane L-L. To be more precise, between two external common local maxima 42 there is additionally positioned an intermediate common local maximum 42* in the first sectional plane M-M. This intermediate common local maximum 42* is positioned substantially in the middle between the two external common local maxima 42 (see FIG. 20a) and also substantially in the middle between two neighboring through-channels 30 (see FIG. 19).

Figure 20A:
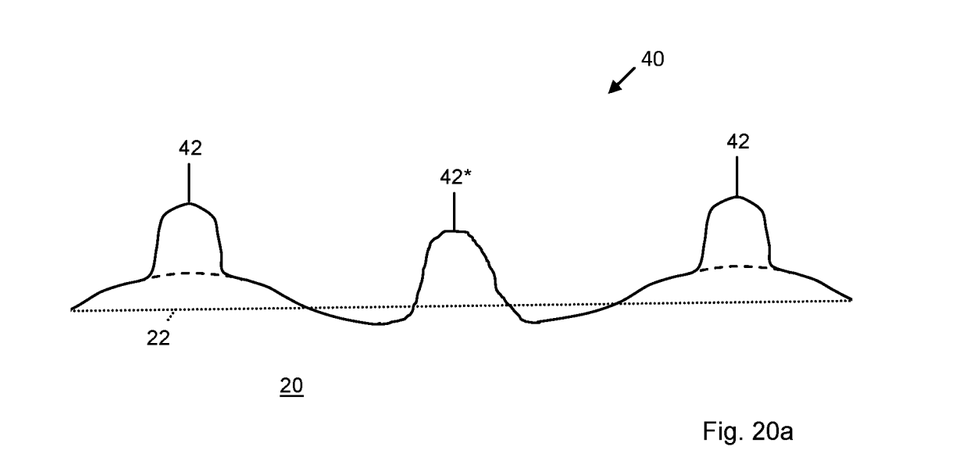
FIG. 20a shows an enlarged view of a portion of FIG. 20.

As best seen in FIG. 20a, the intermediate common local maximum 42* has not the same height as but a lower height than the two external common local maxima 42. Furthermore, in this exemplary embodiment, the intermediate common local maximum 42* does not have a pin-like structure differently to the two external common local maxima 42.

Especially when the substrate 20 is used as forming fabric, the intermediate common local maximum 42* provides an additional supporting point for the fibers of the nascent fiber web. Thus, these fibers can more efficiently be prevented from clogging the through-channels 30 that are neighboring each other and the intermediate common local maximum 42*. At the same time the open area ratio on the paper side of the substrate 20 remains pretty large. All this results in a good formation quality of the fiber web that is formed on the substrate 20.

The following is a summary list of reference numerals and the corresponding structure used in the above description of the invention:

20', 20 substrate
22', 22 first surface
24', 24 second surface
26' first lateral edge
28' second lateral edge
30', 30 through-channel
31 through hole of first type
32 through hole of second type
34 circular upper rim of through hole
35 elliptical upper rim of through hole
36 circular lower rim of through hole
38 upper rim of through-channel
40 pin-like-structure
42 (external) common local maximum
42* intermediate common local maximum
44, 44* first portion that is convexly shaped
46, 46* second portion that is concavely shaped
48, 48* third portion that is convexly shaped
50; 50* first inflection point
52; 52* second inflection point
a, b diameter of lower rim
A, B diameter of upper rim
CA central axis
LB laser beam
MR middle region
R roller
TD thickness direction
WD width direction

The invention claimed is:

1. A paper machine clothing, comprising:
   a substrate with an upper side, a lower side, two lateral edges and a usable region between said two lateral edges;
   said usable region having a plurality of through-channels formed therein each extending along a central axis through said substrate and connecting said upper side with said lower side;
   said through-channels being non-cylindrical with a cross-sectional area thereof becoming smaller along a thickness direction of the substrate from said upper side to a middle region of said substrate between said upper side and said lower side;
   said through-channels having an upper rim and at least two of said through-channels being neighboring through-channels with upper rims directly contacting one another; and
   said upper rims of said neighboring through-channels having at least three common local maxima with two external common local maxima and one intermediate common local maximum located between said two external common local maxima.

2. The paper machine clothing according to claim 1, wherein all of said at least three common local maxima lie within a first sectional plane that is parallel to the thickness direction of said substrate.

3. The paper machine clothing according to claim 2, wherein the first sectional plane is equidistant from central axes of said two neighboring through-channels.

4. The paper machine clothing according to claim 2, wherein said intermediate common local maximum lies in a second sectional plane that includes central axes of said two neighboring through-channels.

5. The paper machine clothing according to claim 1, wherein a height of said intermediate local maximum is lower than a height of any of said two external common local maxima.

6. The paper machine clothing according to claim 1, wherein:
- a third sectional plane, being parallel to the thickness direction of the substrate, including one of said two external common local maxima and including or intersecting a central axis of at least one of said two neighboring through-channels defines an intersecting line with a sidewall of said at least one of said two neighboring through-channels; and
- an intersecting line includes a first portion that is convexly shaped, a second portion that is concavely shaped and a third portion that is again convexly shaped along the thickness direction of said substrate from the at least one common local maximum toward the middle region of said substrate.

7. The paper machine clothing according to claim 1, wherein:
- at least 90% of said through-channels in said usable region of said substrate have an upper rim that directly contacts an upper rim of at least one other neighboring through-channel of said plurality of through-channels in said usable region of said substrate; and
- said upper rims of at least 12% of said directly neighboring through channels have at least three common local maxima with said two external common local maxima and said one intermediate common local maximum between said two external common local maxima.

8. The paper machine clothing according to claim 7, wherein all of said through-channels in said usable region of said substrate have an upper rim that directly contacts an upper rim of all other neighboring through-channels of said plurality of through-channels in said usable region of said substrate.

9. The paper machine clothing according to claim 1, wherein less than 5% of a surface on said upper side of said substrate in said usable region is flat and substantially orthogonal to the thickness direction of said substrate.

10. The paper machine clothing according to claim 9, wherein none of the surface on said upper side of said substrate in said usable region is flat and substantially orthogonal to the thickness direction of said substrate.

11. The paper machine clothing according to claim 1, wherein between 70% and 90% of a surface on said lower side of the substrate is flat and substantially orthogonal to the thickness direction of said substrate.

12. The paper machine clothing according to claim 11, wherein between 75% and 85% of the surface on said lower side of said substrate is flat and substantially orthogonal to the thickness direction of said substrate.

13. The paper machine clothing according to claim 12, wherein approximately 80% of the surface on said lower side of said substrate is flat and substantially orthogonal to the thickness direction of said substrate.

14. The paper machine clothing according to claim 1, wherein a shape of the cross-sectional area of at least one of said through-channels changes along the thickness direction of said substrate from said upper side to said lower side.

15. The paper machine clothing according to claim 14, wherein the shape of the cross-sectional area of all of said through-channels changes along the thickness direction of said substrate from said upper side to said lower side.

16. The paper machine clothing according to claim 14, wherein the shape of the cross-sectional area is substantially more elliptical in an upper region of said at least one of said through-channels than in a lower region of said at least one of said through-channels.

17. The paper machine clothing according to claim 16, wherein the shape of the cross-sectional area in the upper region of said at least one through-channel has a first dimension extending in a cross-machine direction and a second dimension extending in a machine direction, wherein said first dimension is either smaller or larger than said second dimension.

18. The paper machine clothing according to claim 14, wherein the shape of the cross-sectional area is substantially circular on a lower side of said substrate.

19. A method of producing a paper machine clothing according to claim 1, the method comprising:
- providing a substrate having a first surface and a second surface, wherein the first surface and the second surface are substantially planar and parallel to each other; and
- forming a plurality of non-cylindrical through holes into a usable region of the substrate by using a laser;
- forming at least some, or all, of the plurality of through holes that neighbor each other at such a close distance that the neighboring through holes partially overlap each other;
- while forming the plurality of non-cylindrical through holes controlling the laser to form upper rims of mutually overlapping through holes with at least three common local maxima, including two external common local maxima and one intermediate common local maximum located between the two external common local maxima.

20. The method according to claim 19, wherein, after all of the through holes have been formed into the usable region of the substrate, at least one of the first surface or the second surface of the substrate in the usable region has disappeared by at least 90% or up to 100%.

* * * * *